J. PESHEK.
MILK CAN.
APPLICATION FILED APR. 4, 1911.
997,324.
Patented July 11, 1911.
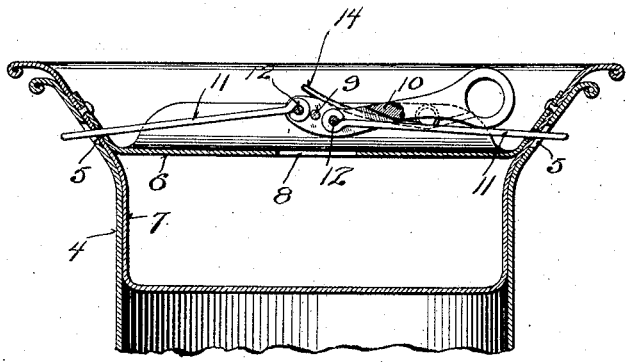
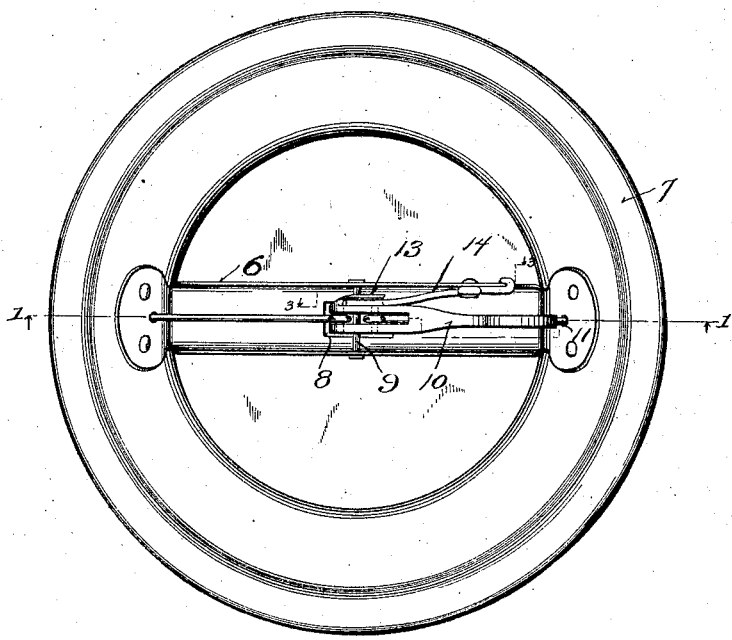
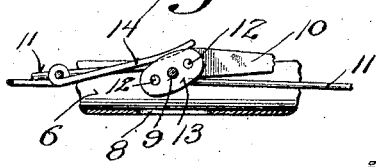

UNITED STATES PATENT OFFICE.

JOHN PESHEK, OF FRANKSVILLE, WISCONSIN.

MILK-CAN.

997,324.  Specification of Letters Patent.  Patented July 11, 1911.

Application filed April 4, 1911. Serial No. 618,923.

*To all whom it may concern:*

Be it known that I, JOHN PESHEK, a citizen of the United States, and resident of Franksville, in the county of Racine and State of Wisconsin, have invented certain new and useful Improvements in Milk-Cans; and I do hereby declare that the following is a full, clear, and exact description thereof.

My invention consists in what is herein particularly set forth with reference to the accompanying drawings and pointed out in the claims of this specification, its object being to provide milk-can lids with simple, economical and efficient means by which to lock them in engagement with the cans and thus prevent the loss of milk from said cans in case the same are upset.

Figure 1 of the drawings represents a sectional view indicated by line 1—1 in Fig. 2, and illustrating a fragment of a closed milk-can having the lid thereof provided with means for locking the same in position to close said can; Fig. 2, a plan view of the closed can and lid-locking means, and Fig. 3, a partly sectional view of a detail of the lid-locking means, this view being indicated by line 3—3 in Fig. 2.

Referring by numerals to the drawings, 4 indicates the neck of a milk-can having its upper flaring portion provided with diametrically opposite openings 5 of any suitable form and area.

The handle 6 of the can-lid 7 is for the most part trough-like and riveted or otherwise suitably fastened to the upper flaring portion of said lid, said handle being preferably provided with a central bottom opening 8. The handle is provided, centrally thereof, with a transverse pivot 9 for the inner cranked and longitudinally slotted end of a lever 10. Inner eye-ends of a pair of bolt-rods 11 are straddled by the slotted end of the lever, and said lever is provided with pivots 12 that extend through the eye-ends of the bolt-rods, these pivots being in opposite directions from the pivot 9 upon which the lever 10 is fulcrumed. The bolt-rods are guided in apertures with which the ends of the handle 6 and the flare of the lid are provided.

The cranked end of the lever is provided with a cam offset 13, and fastened to the lid-handle 6 is a spring-rod 14 that bears at its free end upon said offset to hold said lever in adjusted position. The lever being swung down in one direction, the bolt-rods 11 are retracted, but when swung down in the opposite direction said bolt-rods are shot. The lid being placed in the can to aline its handle with the can-openings 5, the lever is operated to shoot the previously retracted bolt-rods through said openings, and thus said lid is held against separation from said can in case the latter is upset. Hence a loss of milk from said can is avoided, it being necessary to retract said bolt-rods clear of said can before the lid can be removed. The bottom opening 8 in the lid handle under the lever prevents an accumulation of snow or ice that would be detrimental to the operation of said lever. The outer free end of the lever is preferably provided with a finger-hole, and a sealing wire or strip may be run through said hole.

I claim:

1. A milk-can lid, its handle, a lever fulcrumed in connection with the handle and provided with a cam offset, a spring-rod secured to the handle in opposition to said offset of the lever, and lever-controlled bolt-rods that extend oppositely through guide-apertures in the handle and lid, these rods being for engagement with openings provided in the can to which the lid is applied.

2. A milk-can lid and its handle, a lever having a longitudinally slotted and cranked end fulcrumed in connection with the lid, and bolt-rods straddled by said end of the lever to which they are pivotally connected in opposite directions from its fulcrum to extend through guide-apertures in the handle and lid to engage openings provided in the can to which said lid is applied.

3. A milk-can lid and its handle, a lever having a longitudinally slotted and cranked end fulcrumed in connection with the lid and provided with a cam-offset, a spring-rod secured to the handle in opposition to said offset of the lever, and bolt-rods straddled by said end of the lever to which they are pivotally connected in opposite directions from its fulcrum to extend through guide-apertures in the handle and lid to engage openings provided in the can to which said lid is applied.

4. A milk-can lid, its handle that is for the most part trough-like and provided with a bottom opening, and means in connection with the handle for locking the lid in its engagement with the can.

In testimony that I claim the foregoing I have hereunto set my hand at Franksville in the county of Racine and State of Wisconsin in the present of two witnesses.

JOHN PESHEK.

Witnesses:
   JOHN DIETRICH,
   JOHN HESS.

Copies of this patent may be obtained for five cents each, by addressing the "Commissioner of Patents. Washington, D. C."